Oct. 25, 1932. A. DINA 1,884,605
SHUTTER MECHANISM
Filed Oct. 27, 1928 3 Sheets-Sheet 1

Inventor
AUGUSTO DINA
By his Attorney

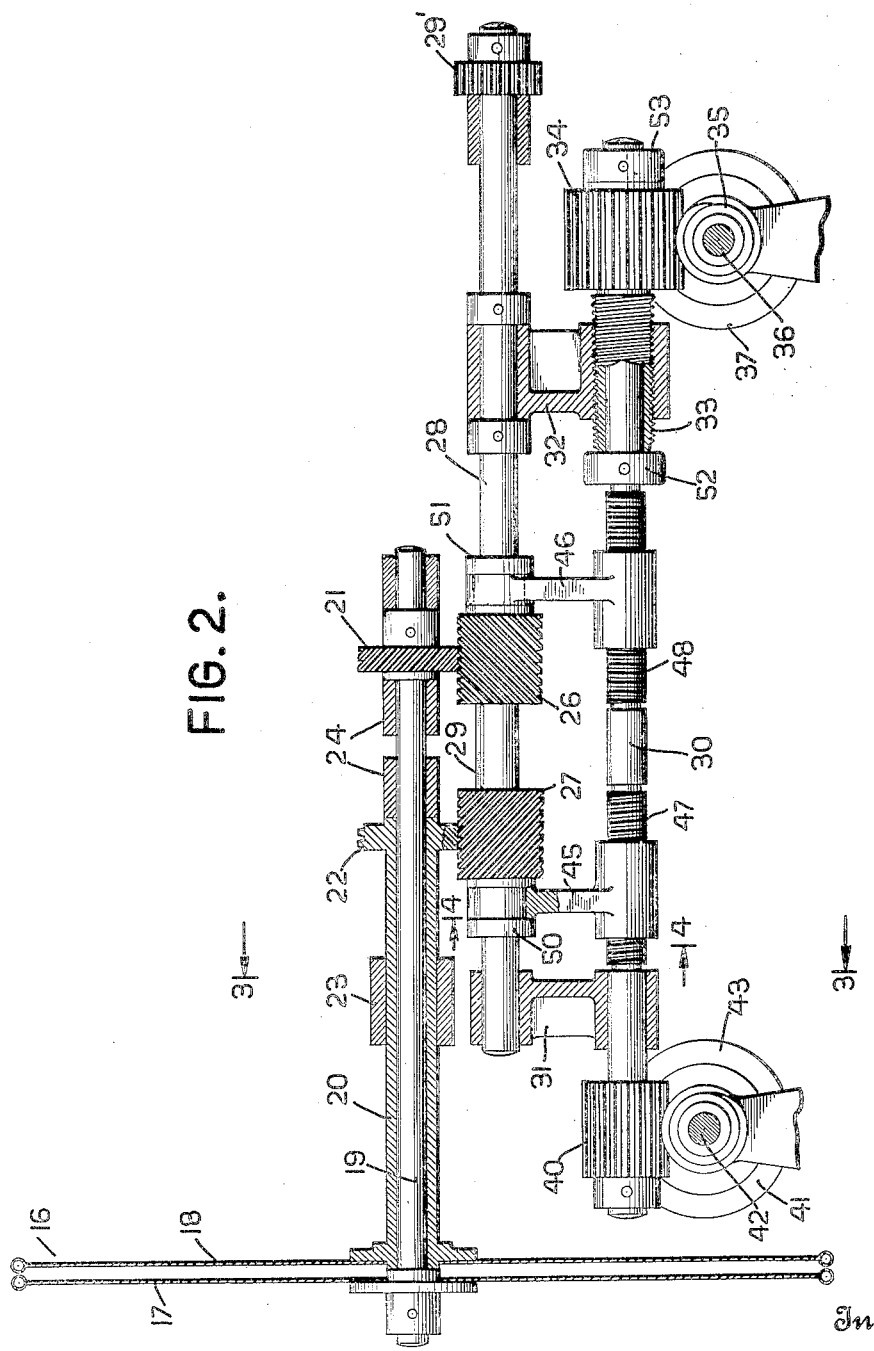

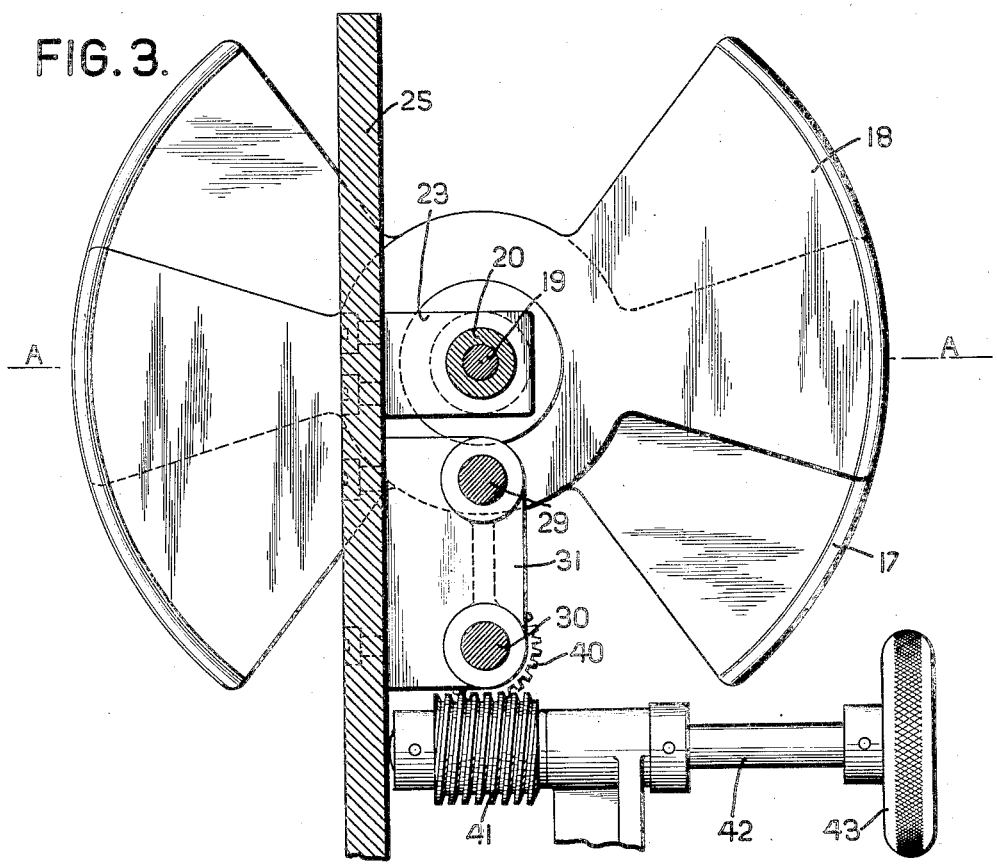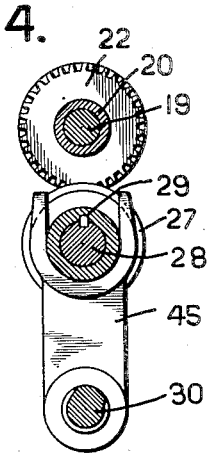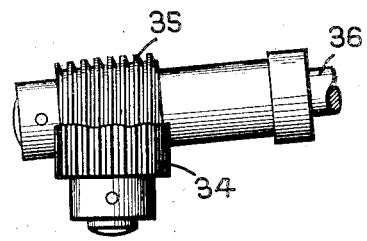

Patented Oct. 25, 1932

1,884,605

UNITED STATES PATENT OFFICE

AUGUSTO DINA, OF JERSEY CITY, NEW JERSEY, ASSIGNOR TO INTERNATIONAL PROJECTOR CORPORATION, OF NEW YORK, N. Y., A CORPORATION OF DELAWARE

SHUTTER MECHANISM

Application filed October 27, 1928. Serial No. 315,406.

This invention relates to an improved shutter mechanism for motion picture projection machines, and more particularly to a novel shutter mechanism which is capable of being adjusted during operation to thereby obtain maximum efficiency of light passage and to permit proper projection at any speed.

In projection machines it is essential to maintain a definite time relationship between the film and the shutter in order to admit the maximum amount of light to the film while preventing formation of "fringes" on either the top or bottom edges of the printed matter or the characters or objects shown in the picture. These fringes, which are known in the art by the term "travel ghost", appear at the top of the picture when the shutter is late in closing and appear at the bottom of the picture when the shutter opens too early. They may also appear simultaneously at the top and bottom if the shutter opening is too large and both of the above conditions of timing occur. In a shutter of the usual type having a rigid blade it is possible to adjust the time of opening or time of closing with respect to the single picture or exposure of the film, but there has been no means heretofore for independently adjusting both of these points in order to secure the maximum shutter opening. Heretofore the maximum shutter opening was commonly accomplished by changing from a three blade shutter to a two blade shutter.

It is an object of the present invention to provide a shutter having a blade which may be adjusted as to width or amplitude and which may be adjusted as to time of cut-off.

Another object is to provide a shutter mechanism in which both the time of opening and time of closing may be independently adjusted to eliminate the travel ghost.

Another object is to provide for a motion picture machine, a shutter in which both the upper and lower travel ghosts may be eliminated and the maximum permissible shutter opening obtained.

A feature of the invention is a compound shutter formed of a plurality of discs, the relative positions of which may be adjusted at will.

Another feature is a shutter having a plurality of discs which may be adjusted about the common axis in unison for varying the timing thereof or may be angularly adjusted in opposition about said axis for changing the shutter opening.

Another feature is the provision of a novel manual adjusting device whereby the above adjustments of the shutter discs may be obtained without interrupting the normal running of the machine.

The above objects and others which will be apparent as the nature of the invention is disclosed by the following description, are preferably accomplished by providing a pair of discs which preferably are independently rotated about a concentric axis. Driving mechanism is employed for independently driving said discs, and means is incorporated in said driving mechanism for varying the angular position thereof either in unison or in opposite directions. When the two discs are varied in unison the timing of the shutter is altered with respect to the exposure on the motion picture film. When the discs are varied in opposite directions, however, the effective width or amplitude of the blades is altered whereby the time of projection of the picture may be controlled.

The driving mechanism preferably comprises driving and driven shafts mounted in parallel relationship and having cooperating sets of worm gears, one set being employed for driving each of the discs. Means is provided for moving one gear of each set longitudinally with respect to the other gear, thereby varying the angular relationship of the driving shaft with respect to the driven shafts. A central means is also provided for moving said gears, usually simultaneously, either in the same direction or in opposite directions whereby both the timing and the size of shutter opening may be controlled at will.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which Fig. 1 is a side elevation of a projection machine showing the location of the shutter mechanism in respect to the other main elements of a projection machine;

Fig. 2 is a longitudinal view partly in section of the shutters and driving mechanism;

Fig. 3 is a section taken on the line 3—3 of Fig. 2 showing the relative positions of the shutters;

Fig. 4 is a section taken on the line 4—4 of Fig. 2 showing the adjusting yoke; and Fig. 5 is a detail view showing the arrangement of part of the control mechanism.

Like reference characters denote like parts in the several figures of the drawings.

Figure 1:
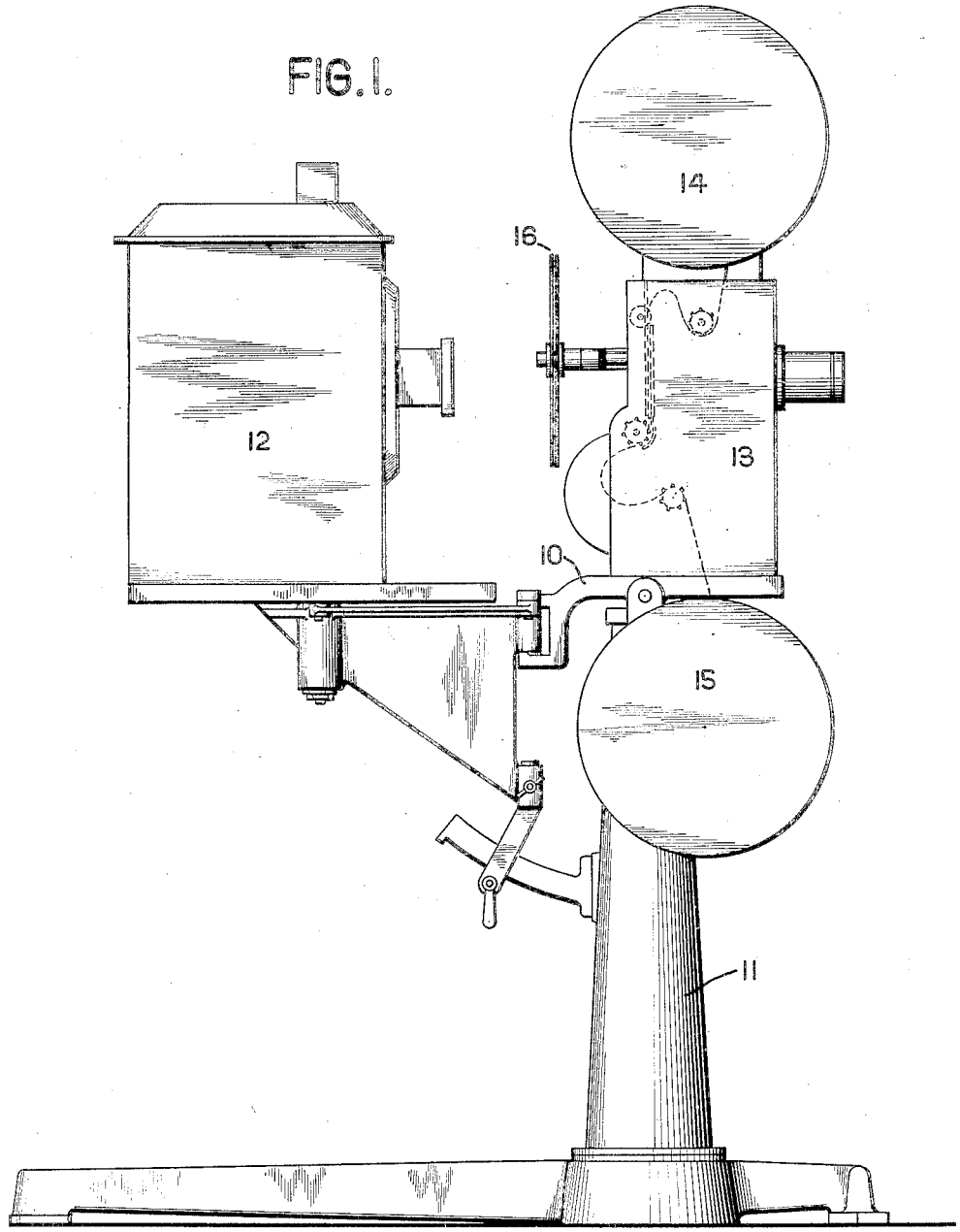

In the following description and in the claims parts will be identified by specific names for convenience, but they are intended to be as generic in their application to similar parts as the art will permit.

Referring to the drawings more in detail, the invention is shown as applied to a projection machine comprising a pedestal lever 10 supported upon pedestal 11 in the usual manner and carrying a lamphouse 12, projection head 13, and upper and lower film magazines 14 and 15 respectively. Shutter 16 is in this instance mounted between lamphouse 12 and projection head 13 in a suitable position to intercept the light which is applied to the aperture plate of said projection head.

The shutter 16 is in this instance composed of a pair of discs 17 and 18 which are rigidly secured to shaft 19 and sleeve 20 respectively and are independently driven by worm gears 21 and 22 which are respectively secured to said shaft and sleeve. Said discs are preferably identical in shape and comprise a plurality of blades separated by spaces through which the light passes to the film. Two blade discs have been disclosed, although discs having any desired number of blades may be employed. Shaft 19 and sleeve 20 may be mounted in any suitable manner, such as by bearing members 23 and 24, which may be secured to plate 25 (Fig. 3) of the projection head.

Gears 21 and 22 are driven by cooperating worm gears 26 and 27 respectively which are slidably mounted upon driving shaft 28 by any suitable means such as key 29. These worm gears 26 and 27 are preferably formed with their teeth inclined in opposite directions in order to neutralize the driving thrust. Shaft 28 may be driven by gear 29' which cooperates with a suitable main driving gear (not shown).

The mechanism for controlling the longitudinal position of gears 26 and 27 preferably comprises shaft 30 which is supported in parallel relationship to shaft 28 by suitable supporting means such as brackets 31 and 32. These brackets are preferably provided with bearings in which both shafts 28 and 30 are rotatably supported. Also, these brackets may be secured in any desired manner to a portion of the projection head such as plate 25.

Shaft 30 is both slidably and rotatably supported in bracket 31 and is supported in bracket 32 by means of bushing 33 which is threaded in said bracket and provided with a bearing in which shaft 30 rotates. Collars 52 and 53 prevent longitudinal movement of shaft 30 with respect to bushing 33. Said bushing may be operated by any suitable means such as gear 34 which is rigidly secured thereto and which is in engagement with worm gear 35 which in turn is carried upon shaft 36 and controlled by hand wheel 37. Shaft 36 is preferably inclined to the normal with respect to shaft 30 in a manner disclosed in Fig. 5 so that the threads of worm wheel 35 extend parallel to the gear teeth of spur gear 34, thereby permitting said spur gear to be moved longitudinally while said worm gear remains stationary.

For rotating shaft 30 to accomplish additional adjustment of the discs there is provided a spur gear 40 adapted to be rotated by worm gear 41 which in turn is secured to shaft 42 and controlled by hand wheel 43. The arrangement of gears 40 and 41 is preferably similar to that of gears 34 and 35 above described.

Yokes 45 and 46 are in engagement with threads 47 and 48 respectively on shaft 30. Said threads preferably are of opposite pitch for the purpose to be later set forth. These yokes 45 and 46 engage suitable collars 50 and 51 carried by worm gears 26 and 27 respectively and thereby determine the longitudinal position of these gears on shaft 28, accordingly as these yokes are moved.

In the operation of the shutter mechanism above described, discs 17 and 18 are normally driven at identical speeds by gears 26 and 27 attached to driving shaft 28. In order to vary the timing of said shutter, hand wheel 43 may be suitably rotated thereby causing rotation of shaft 30 through cooperating gears 40 and 41. Yokes 45 and 46 will therefore be moved in opposite directions, namely, toward or away from the center of shaft 30 due to the opposite pitches of threads 47 and 48. Thus worm gears 26 and 27 are oppositely displaced with respect to worm gears 21 and 22. Said gears 21 and 22 are accordingly rotated in the same direction whereby discs 17 and 18 are simultaneously advanced or retarded as a unit when desired.

The opening of shutter 16 may be controlled by hand wheel 37 as follows. Hand wheel 37, through gears 35 and 34, causes rotation of bushing 33 whereby said bushing is longitudinally advanced with respect to support 32. Shaft 30 is journalled for rotational movement in bushing 33 and prevented from longitudinal movement with respect thereto by collars 52 and 53. Said shaft is accordingly moved longitudinally of its axis and gear teeth 40 slide on worm gear 41. Worm gears 26 and 27 are thus moved simultaneously either to the right or to the left, and since they are of opposite pitch, cause opposite rotational movement of shutters 17 and 18.

Referring to Fig. 3, it will be apparent that opposite movement of said discs serves to increase or decrease the effective width of the openings between the blades thereof and thereby vary the time during which light is admitted to the film.

Various combinations of adjustments may be made by means of the above described mechanism. For example, the two discs may be simultaneously advanced or retarded by varying hand wheel 43, they may be moved with respect to each other by means of hand wheel 37, or one disc may be held stationary and the other adjusted independently thereof by simultaneous movement of both of said hand wheels.

In order to adjust the shutter mechanism above described for obtaining the maximum opening between the blades, the timing of the shutter may be varied as by hand wheel 43 until the travel ghost appears at either the top or bottom of the picture. If this occurs at the top edge it indicates that the shutter is too far retarded. It may accordingly be again advanced until the ghost disappears. The amplitude of the opening may then be increased by hand wheel 37 to again bring the travel ghost into evidence, and then the shutter is again advanced. The above operations are then repeated until the ghost appears at both the top and bottom edges of the picture. When this occurs the timing is varied until the two ghosts appear to be of equal size which indicates that the shutters are properly timed. The amplitude of the shutter opening may then be decreased by wheel 37 until both upper and lower travel ghosts disappear. This indicates that the timing of both the opening and closing of the shutter is correct and that the duration of the opening is the maximum which can be obtained without distorting the picture. Under these conditions it has been found that the geometrical axis of the shutter blades, that is the center of a blade formed by the two discs in partly overlapping relationship as indicated by line A—A in Fig. 3, falls in line with the axis of the lens when three-eighths of the picture has advanced past the center of the aperture.

The shutter mechanism above described permits a clear-cut picture to be obtained and permits the maximum quantity of light to be applied to the film. In a two blade shutter a difference of one degree in the opening or closing will cause a four degree variation in the total dark and light periods. It is evident, therefore, that the effect of a slight amplitude change is multiplied in accordance with the number of blades being employed and may cause a comparatively large percentage change of total light being admitted to the picture.

Although the invention has been shown and described as applied to a two blade shutter, it is obvious that it is equally applicable to a three blade shutter, or to shutters having other numbers of blades. It is to be noted that the width of the blades may be adjusted at will to any desired extent while the machine is being operated, the adjustment being independent of the speed of the machine. The two discs are adjusted about the same axis by a simple rotational movement without changing their planes of rotation.

In the above disclosure the threads on the two sets of worm gears have been disclosed as being of equal and opposite pitches whereby the same angular variation is attained for each blade. It is obvious, however, that the mechanism may be so constructed that the adjustment may be attained by unequal movement of the discs or one disc may be held stationary and the entire adjustment obtained by the remaining disc.

It is essential in order to operate the projection machine at its greatest efficiency to insure the admission of said light over the longest period of time possible without the introduction of a travel ghost. The mechanism above described permits this to be accomplished and the adjustment to be made while the machine is in operation. It also permits any variation in said adjustment which may be necessary due to the varying characteristics of the films being shown and of the speed at which the machine is being operated.

What is claimed is:

1. In a shutter mechanism, a pair of shutter discs, means for simultaneously driving said discs in the same direction, means for simultaneously advancing or retarding said discs during operation, and means for varying the relative relationship of said discs during operation whereby the duration of opening and the times of opening and closing may be independently adjusted.

2. Shutter mechanism comprising a pair of discs mounted for independent rotation about the same axis, means for independently driving said discs, and means for varying the relationship between said driving means and said discs whereby said discs may be controlled as a unit for advancing or retarding the shutter or may be angularly varied with respect to each other for controlling the effective width of the shutter blade.

3. In a shutter mechanism, a pair of discs mounted for independent rotation about the same axis, gears for independently rotating said discs, worm gears cooperating therewith and having their threads of opposite pitch, means for moving both of said worm gears longitudinally in opposite directions for altering the timing of the shutter, and means for moving said worm gears in the same direction for varying the effective width of a shutter blade.

4. Shutter mechanism comprising a pair of discs, each disc being formed with two diametrically opposed blades, driven gears for independently driving said discs, a worm gear operatively associated with each of said driven gears, a shaft supporting said worm gears, means for varying the longitudinal position of said worm gears on said shaft, comprising yokes associated with said worm gears, a second shaft mounted in parallel relationship with said first shaft, said yokes being mounted on said second shaft by threads of opposite pitch, means for rotating said third shaft whereby said yokes are moved in opposite directions, and means for moving said third shaft longitudinally whereby said yokes are moved in the same direction.

5. Shutter mechanism comprising a pair of discs mounted for rotation about the same axis, driven gears for independently driving said discs, a worm gear operatively associated with each of said driven gears, a driving shaft carrying said worm gears, said gears being free to move longitudinally of said driving shaft and having threads of opposite pitch, collars secured to said worm gears, yokes associated with said collars for determining the longitudinal position thereof with respect to said driven gears, a second shaft mounted in parallel relationship to said driving shaft, said yokes being mounted on said second shaft by threads of opposite pitch, a support for said second shaft comprising a supporting bracket and a bushing threaded therein, spur gears associated with said second shaft and with said bushing, and worm gears cooperating with said spur gears and positioned with the meshing portion of their threads extending parallel to the teeth of said spur gears whereby longitudinal movement of said bushing and said shaft with respect to said worm gears is substantially unimpeded and hand operated means for controlling said worm gears whereby said second shaft may be either rotated or moved longitudinally for varying the amplitude and the timing of said shutter mechanism.

6. In combination with a motion picture projection apparatus including a lamphouse and projection head, a shutter mechanism interposed between said lamphouse and said projection head, said mechanism comprising a pair of discs, each disc being formed with two diametrically opposed blades, a shaft rotatably supporting one of said discs, a sleeve journalled about said shaft and carrying the other of said discs, driven gears associated with said shaft and said sleeve for independently driving said discs, a worm gear operatively associated with each of said driven gears, a driving shaft mounted in parallel relationship to said first mentioned shaft and supporting said worm gears, said gears being keyed to said shaft whereby they may slide longitudinally thereof and having threads of opposite pitch, collars secured to said worm gears, yokes associated with said collars for determining the longitudinal position thereof with respect to said driven gears, a third shaft mounted in parallel relationship to said second mentioned shaft, said yokes being mounted on said third shaft by threads of opposite pitch, a support for said third shaft comprising a supporting bracket and a bushing threaded therein, spur gears associated with said third shaft and with said bushing, and worm gears cooperating with said spur gears and positioned with the meshing portion of their threads extending parallel to the teeth of said spur gears whereby longitudinal movement of said bushing and said shaft with respect to said worm gears is substantially unimpeded, and hand operated means for controlling said worm gears whereby said third mentioned shaft may be either rotated or moved longitudinally for varying the amplitude and the timing of said shutter mechanism.

AUGUSTO DINA.